United States Patent [19]

Störzer

[11] 4,407,178
[45] Oct. 4, 1983

[54] CIRCULAR SAW BLADES

[75] Inventor: Josef Störzer, Horb-Nordstetten, Fed. Rep. of Germany

[73] Assignee: Ledermann GmbH & Co., Horb, Fed. Rep. of Germany

[21] Appl. No.: 304,910

[22] Filed: Sep. 23, 1981

Related U.S. Application Data

[63] Continuation of Ser. No. 66,686, Aug. 15, 1979, abandoned.

[30] Foreign Application Priority Data

Aug. 16, 1978 [DE] Fed. Rep. of Germany ....... 2835714

[51] Int. Cl.³ ............................................. B27B 33/08
[52] U.S. Cl. ...................................................... 83/835
[58] Field of Search ........ 76/112; 51/206 R, 206 NF, 51/206.4; 125/15; 83/835

[56] References Cited

U.S. PATENT DOCUMENTS

| | | | |
|---|---|---|---|
| 2,225,193 | 12/1940 | Benner et al. | 51/206.4 |
| 3,023,551 | 3/1962 | Osenberg | 125/15 |
| 3,526,999 | 9/1970 | Jagers | 83/835 |
| 3,628,292 | 12/1971 | Rue | 51/206 R |
| 4,102,230 | 7/1978 | Magnusson et al. | 76/112 |
| 4,135,421 | 1/1979 | Bertram et al. | 83/835 |

FOREIGN PATENT DOCUMENTS

| | | | |
|---|---|---|---|
| 606001 | 11/1934 | Fed. Rep. of Germany | 51/206 R |
| 848860 | 9/1952 | Fed. Rep. of Germany | 83/835 |
| 468049 | 4/1915 | France | 83/835 |
| 1128866 | 4/1956 | France | 51/206 R |

*Primary Examiner*—Harold D. Whitehead
*Assistant Examiner*—K. Bradford Adolphson
*Attorney, Agent, or Firm*—Becker & Becker, Inc.

[57] ABSTRACT

Circular saw blades, especially for separating wood, cutting grooves into wood and the like materials, are disclosed. Such blades include a cutting zone in which there are arranged cutting teeth, which cutting teeth may be equipped with hard metal cutting plates. Next to the cutting zone there is arranged a carrying zone comprising a central receiving opening. The carrying zone is of approximately constant thickness and is provided at least in the region between the receiving opening and the cutting zone with raised portions. The raised portions are arranged to extend generally over the entire radial and circumferential extent of the carrying zone, substantially continuously in sequence to one another, and in respective opposite direction projecting above the pertaining larger side of the carrying zone. The projections can occupy respectively a section between radii located at an angle of from about 15° to about 30°.

1 Claim, 15 Drawing Figures

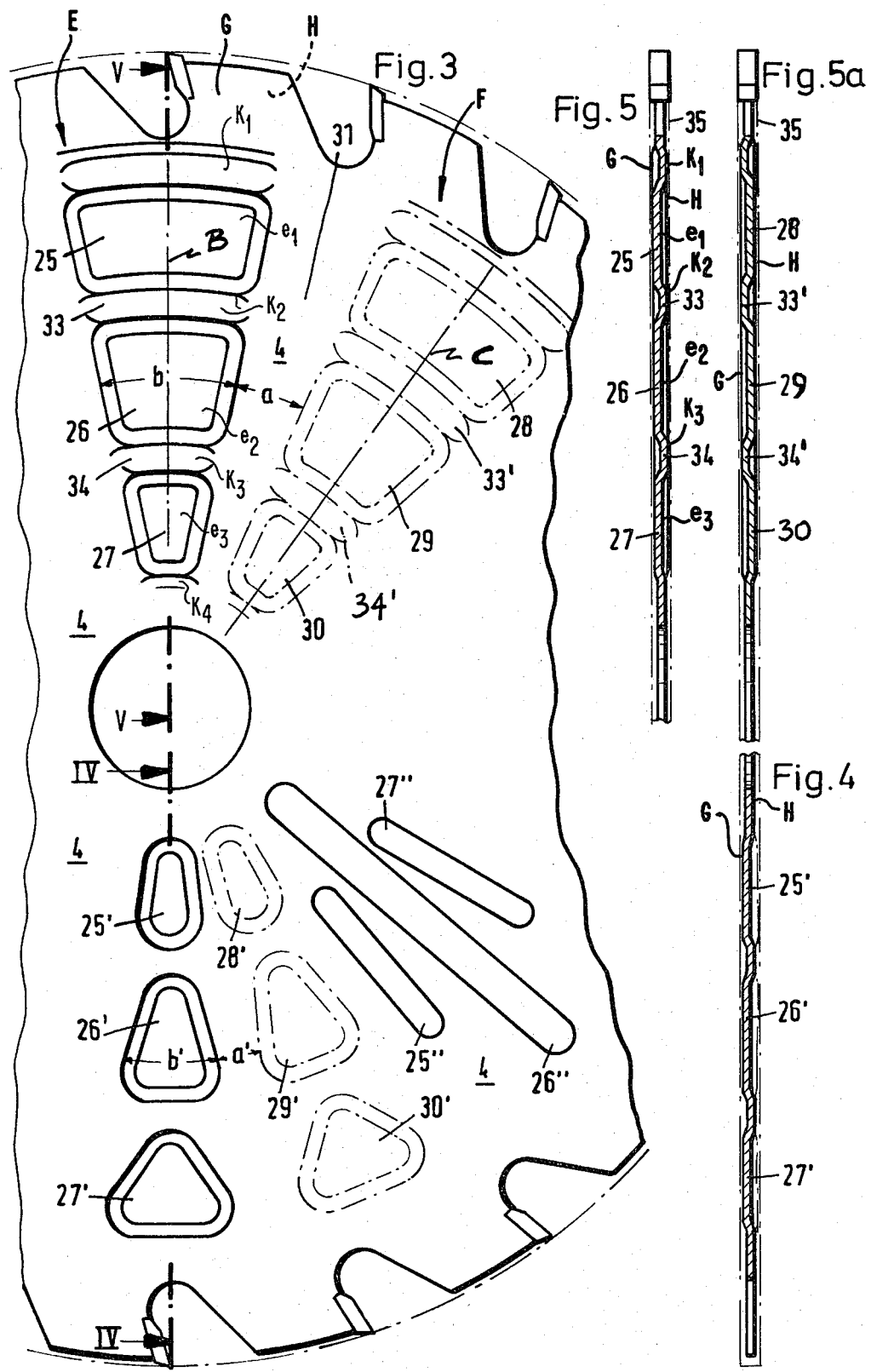

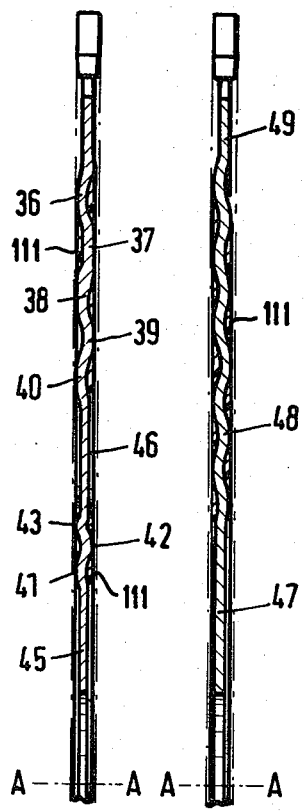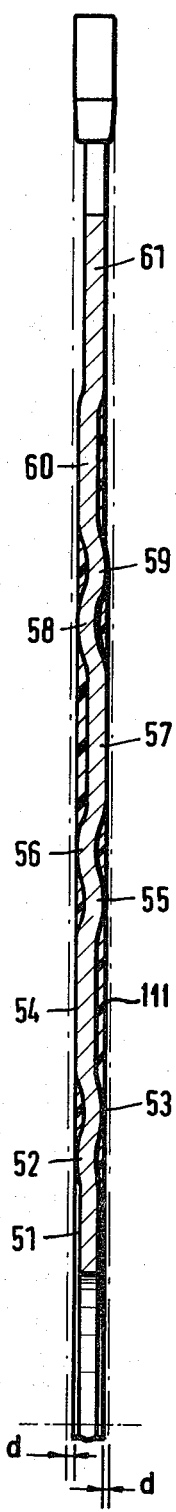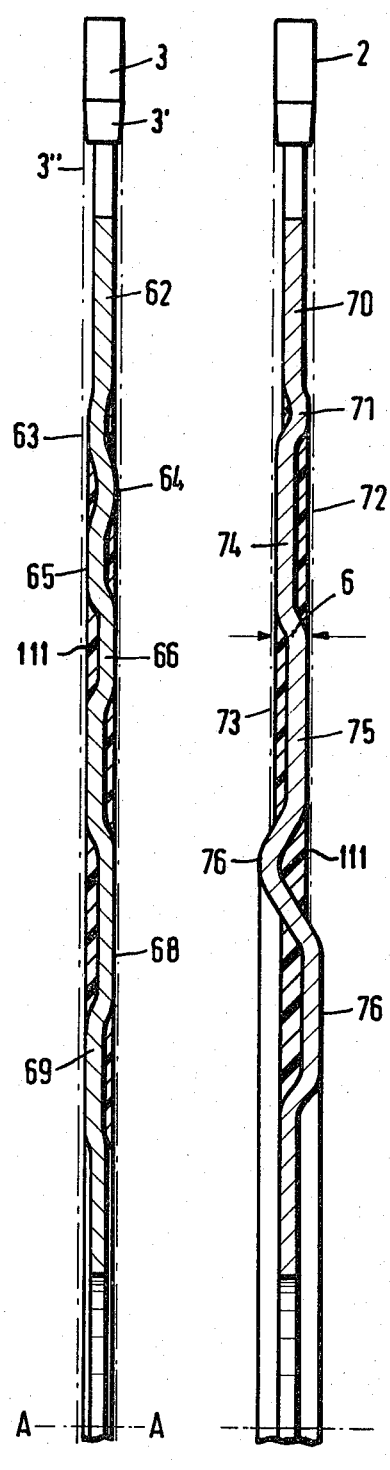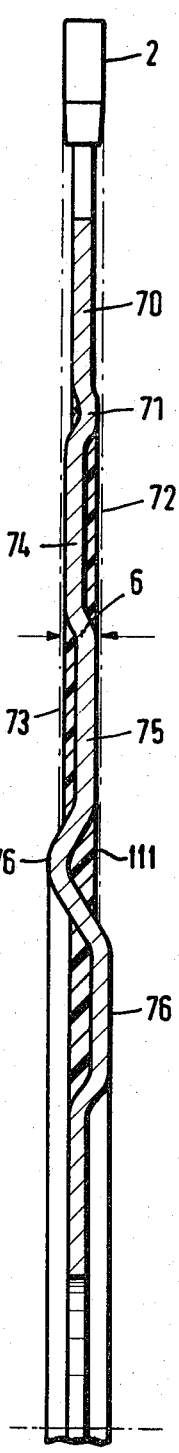

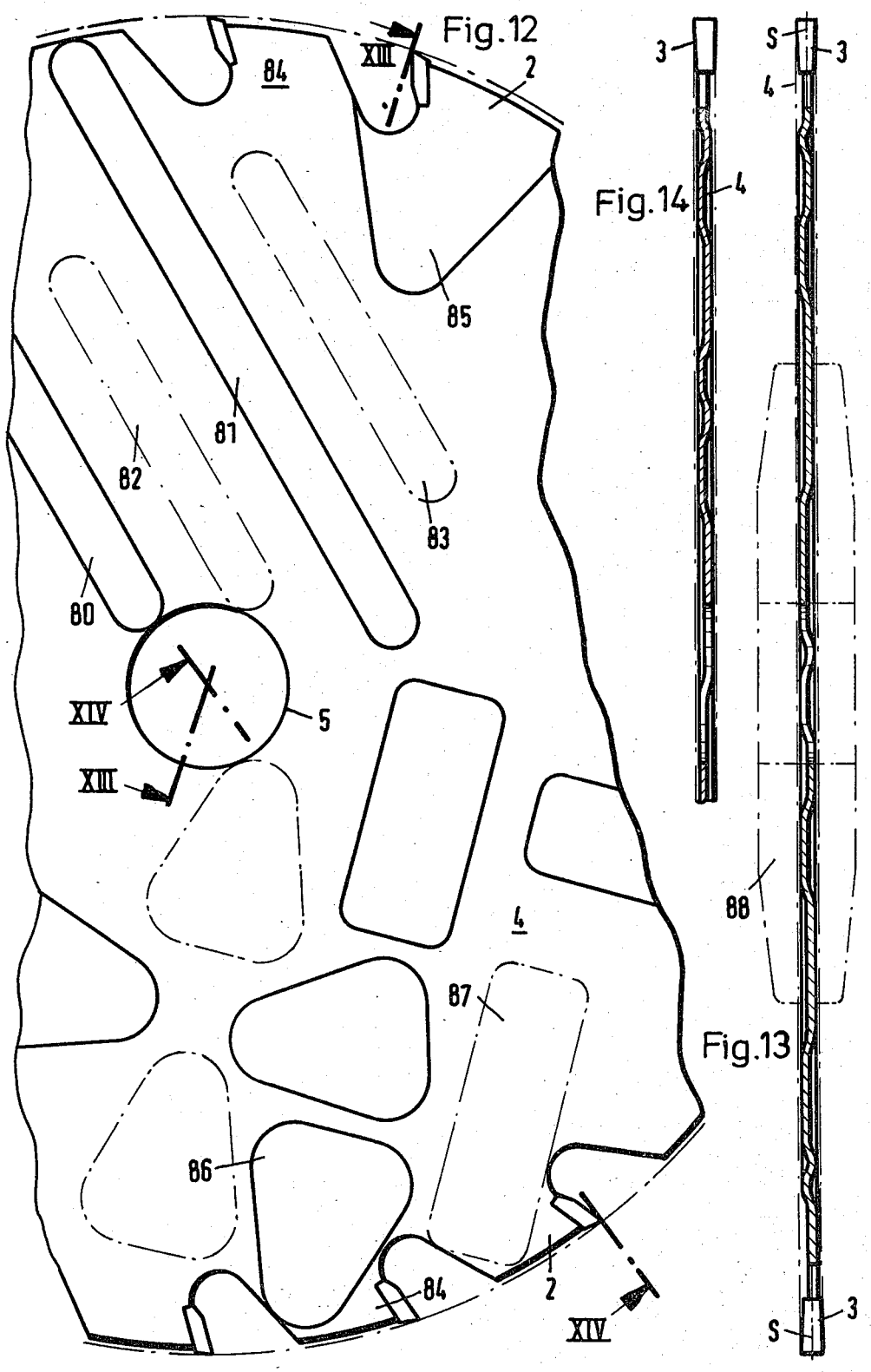

CIRCULAR SAW BLADES

This is a continuation of application Ser. No. 66,686, filed Aug. 15, 1979, abandoned after filing hereof.

The present invention relates to circular saw blades, particularly for sawing wood, cutting grooves into wood and materials similar to wood.

BACKGROUND OF THE INVENTION

Circular saw blades have to provide a definitive inherent tension condition in order to satisfy the demands made thereon during use. These inherent tensions are customarily attained either by peening of the circular saw blade, by application of an annular zone using pressure rollers, or in an inductive manner by compacting material using counterpressure rings. Such compacting of the material achieves only tangential pulling forces. However, in order to attain a further increase of the stability of the circular saw blades, radial tensioning is required which is not attained by such compacting. In these known circular saw blades, finally, there exists the danger that, as the diameter of the cutting circle is increased, the carrying or support disc belonging therewith begins to tumble or wobble when operatively engaging the material to be worked on. When working at high numbers of revolutions or high speed, it will not be possible, accordingly, to produce a straight cut with such a saw blade.

The peening of the blades is difficult, particularly, because peening cannot accurately be applied to defined locations on the saw blade. Also, predetermined hammering is difficult to apply, which leads to considerable deviations of the tolerances, and, thus, to widely differing behavior when using circular saw blades produced in large quantities. Also, application of annular pressure zones on the circular saw blades is laborious and has the disadvantage that the magnitude of the pressure compaction is limited, since in accordance with thickness, material of construction, and size of a saw blade, undesirable deformations can arise.

Furthermore, there are known circular saw blades with somewhat point-like raised portions evenly distributed in circumferential and radial directions, with two of such raised portions being adjacent to one another in radial direction. Such circular saw blades are guided better in radial and circumferential direction, but tend to tumble or wobble when operatively engaging the material to be cut. However, due to the low area of the raised portions, and due to the relative large unformed areas of the carrying or support disc, such blades do not exhibit the stiffness required for positive and clean cutting. Such blades also tend to be noisy during use.

FIELD OF THE INVENTION

It is accordingly an object of the invention to provide a circular saw blade in which the tangential and radial tensions, respectively, are such that despite reduced weight, and also at large diameter of the carrying disc or support zone, the stiffness or rigidity thereof is so high that even at high cutting efficiency an accurate and quiet running thereof are assured.

This object and other objects and advantages of the present invention will appear more clearly from the following specification in connection with the accompanying drawings in which:

BRIEF DESCRIPTION OF DRAWINGS

FIG. 3 shows a plan view of a portion of a further circular saw blade to indicate different shapes for raised portions in the upper section and in the lower section, respectively;

FIG. 4 is a section taken along line IV—IV in FIG. 3;

FIG. 5 is a section taken along line V—V in FIG. 3;

FIG. 5a is a section similar to that of FIG. 5;

FIGS. 6 to 10 are sections similar to that of FIG. 5, and show further embodiments of blades in accordance with the present invention;

FIG. 12 is a further plan view of a circular saw blade with raised portions arranged asymmetrically in radial direction, which portions extend to the outer periphery of the zone for the cutting teeth.

FIG. 13 is a section taken along line XIII—XIII in FIG. 12; and

FIG. 14 is a section taken along line XIV—XIV in FIG. 12.

SUMMARY OF THE INVENTION

Figure 1:
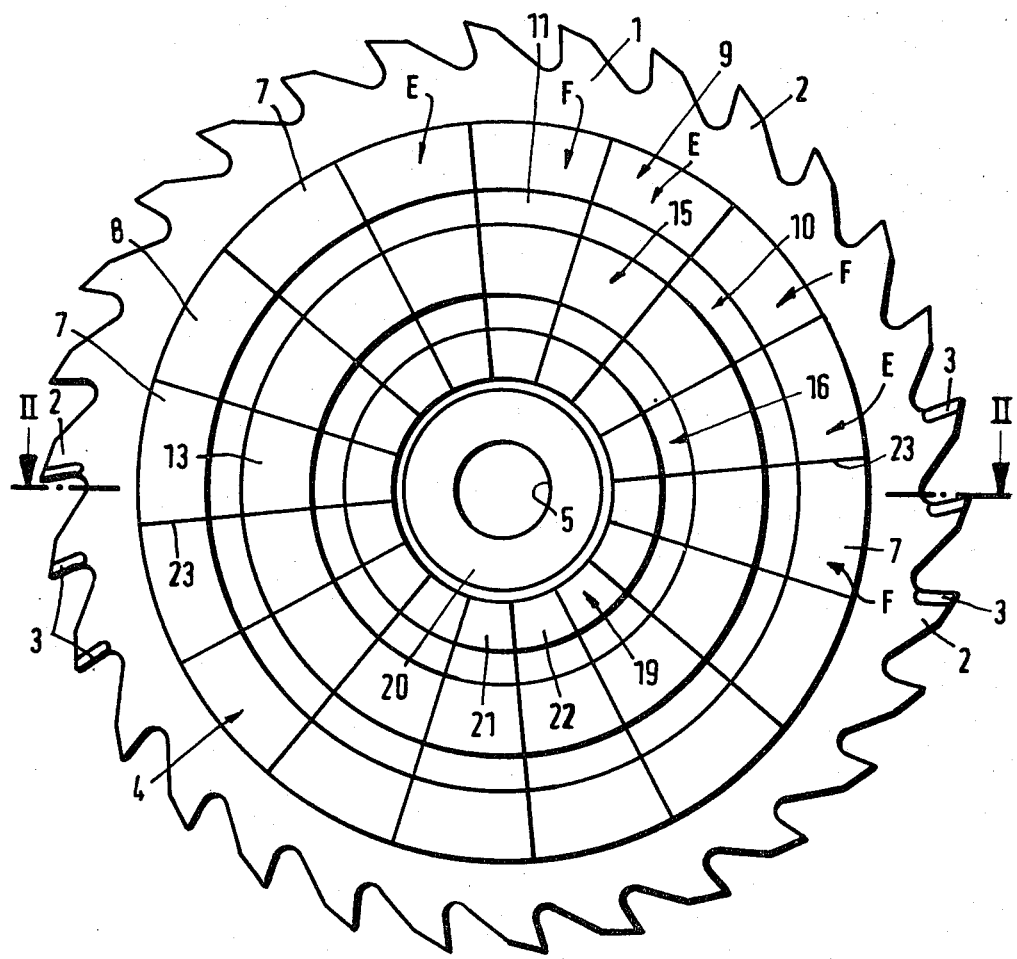
FIG. 1 is a top plan view of a circular saw blade in accordance with one embodiment of the invention.

The object of the invention is primarily attained by circular saw blades having raised portions arranged to extend generally over the entire radial and circumferential extent of the carrying zone, substantially continuously in sequence to one another, and in alternating manner projecting from one or the other large side or surface of the carrying or support zone.

Such approximately honeycomb-profile provides for an optimal rigidity of the circular saw blades in radial direction and tangential direction, respectively, so that, even when high cutting forces are present, and in the case with saw blades having large diameters, tumbling or wobbling movements are substantially avoided. Furthermore, due to their inherent stiffness or rigidity, in comparison with the known circular saw blades, saw blades in accordance with the invention can be made of thinner material so that a considerable amount of material can be saved. Due to the more quiet running of such blades, not only is there attained a high cutting efficiency and more clean cutting, but also noise during idle running and during operation is substantially reduced. The honeycomb-profile formation provides the great advantage, furthermore, in that only small areas are in frictional contact with the material to be worked on when commencing use of the circular saw blades. This friction does not affect the good running behavior of the circular saw blades and avoids undue heating. Excessive heating is also prevented by a swirling of the air at the profiled surface of the carrying or support zone belonging therewith. In fact, a cooling is achieved. Since the profile according to the invention can be produced in a single operation during manufacture of the circular saw blades, no expensive and elaborate further subsequent treatment or production steps are required.

In accordance with one embodiment of the invention, the distance of circumferentially adjacent portions is at least partially smaller than their circumferential width at the same radial height, or on a given circumference.

In accordance with another embodiment of the invention, at least the greater circumferential width of the radially successive raised portions increases radially outwardly in the direction towards the cutting zone.

In accordance with another preferred embodiment of the invention, the raised portions are tapered radially inwardly, particularly, they have approximately triangular, trapezoidal, and the like configuration.

In accordance with another embodiment of the invention, the raised portions are asymmetrically arranged on the carrying or support zone.

It will also be possible in accordance with another preferred embodiment of the invention to provide hard metal plates eccentrically arranged relative to the carrying zone.

It is also preferred to arrange raised portions of triangular shape immediately adjacent to a cutting plate.

In accordance with another embodiment of the invention, the raised portions which are adjacent to each other in circumferential direction are provided on ring zones which are concentric to one another.

In accordance with another preferred embodiment of the invention, between the raised portion radially adjacent to one another, there are provided ridges or projecting beads which preferably alternatingly project or point away from the large sides of the saw blade belonging therewith.

In accordance with another embodiment of the invention, the raised portions adjacent to one another in circumferential direction extend transversely to a radial plane and are of generally longitudinal configuration; more particularly, the raised portions are equidistant and can be of varying lengths.

In accordance with another embodiment of the invention, the raised portions have planar and/or rounded bottom surfaces.

In accordance with another preferred embodiment of the invention, the saw blade is provided with projections or deformed sections which extend beyond the plane established by the flanks of the hard metal plates which can be operatively secured to at least some of the teeth of the blade.

In accordance with another embodiment of the invention, the transition between raised portions is rounded, preferably the radial transition is rounded between adjacent portions.

In accordance with another embodiment of the invention, the smallest axial distance of raised portions away from the plane established by a flank of the hard metal plates belonging therewith is in conformity with the distance to the customary axial clearance provided by a flat saw blade.

Circular saw blades in accordance with another preferred embodiment include at least in some of the hollow spaces provided by the raised projections there is a coating, or filling, preferably comprising a synthetic material.

DETAILED DESCRIPTION

Figure 2:
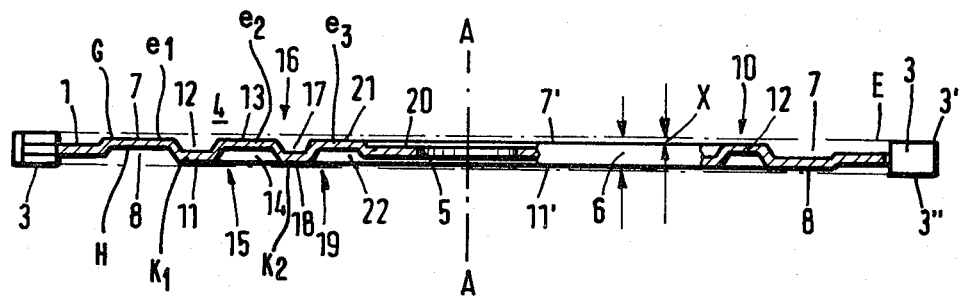
FIG. 2 is a section taken along line II—II of FIG. 1.

Referring now particularly to the drawings, the blade shown in FIGS. 1 and 2 has a cutting zone 1 in which there are provided cutting teeth 2. The cutting teeth 2 are equipped with hard metal plates 3 (shown at the cutting teeth 2 in the vicinity of line II—II). Merely by way of example, the blade has thirty (30) cutting teeth.

Radially inwardly following the cutting zone there is a carrying or support disc or carrying or support zone 4, presenting the so-called main blade; the zone 4 is provided at its center with a receiving bore or aperture 5 for securing the blade on a drive shaft, not shown. The thickness of the material used for carrying or support zone 4, measured in the axial direction corresponds to 0.4 times the cutting width of the hard metal plates 3 (FIG. 2).

In order to improve the stability and the running behavior of the circular saw blade during use thereof, in particular to avoid axial tumbling or wobbling, the zone 4 is provided with a pattern of raised portions, projections, or the like.

The pattern on the carrying zone 4 is characterized primarily by concentric, annular zones 9, 10, 15, 16, and 19, extending concentrically to the axis A (FIG. 2), i.e. center A in FIG. 1. Zone 9 includes raised portions of projections 7 and 8 formed, for example, by minting, creasing, pressing, or similar shaping of material. Advantageously, the portions 7 and 8 are respectively provided on the sides of the carrying zone 4 whereby the portions 7 extend axially on one side and the portions 8 extend axially on the other side to the central plane of symmetry of the zone 4 (FIG. 2).

As seen in the plan view according to FIG. 1, a raised portion 7 alternates with a raised portion 8 in zone 9. Each portion 7 or 8 extends over an angle of about 22.5°.

Next to the outer or first zone 9 there is a second, narrow annular zone 10 with raised portions or projections 11 and 12, which, in turn, alternate with further radially inwardly arranged raised portions or projections 13 and 14 of the third zone 15. Next to the third zone 15 there is provided the narrow annular zone 16 having raised portions or projections 17 and 18. Next to this zone 16 is the fifth annular zone 19 having raised portions or projections 21 and 22. Next to zone 19 is the central zone 20 with the receiving bore 5. The projections or portions 21 of zone 19 are on the same side of zone 4 as are the projections 18, 13, 12, and 7, while the portions 22 of zone 19 are on the same side of zone 4 as are the raised portions 17, 14, 11, and 8 with reference to FIGS. 1 and 2 while axial play "d" exists laterally as marked in FIG. 8.

The axial extent of the raised portions is preferably somewhat smaller than the largest width of the cutting teeth 2 so that a plane E containing the flanks 3' and 3" of the hard metal plates 3 have an axial distance X to the parallel thereto extending surfaces 7' and 11' of raised portions 7 and 11. This distance corresponds to the distance between the flanks of hard metal plates and the lateral planes or sides of a carrying disc without raised portions in known circular saw blades. Such distance X can be in a range of from about 0.4 to about 0.6 mm. The raised portions 7 and 8 of zone 9; 11 and 12 of zone 10; 13 and 14 of zone 15; 17 and 18 of zone 16; and 21, 22 of zone 19; thus, extend to the planes cut with the blade with the customary axial tolerance of known blades, whereby the width of the cut into the material being worked on corresponds to the width 6 (FIG. 2) of plates 3.

Due to the structural compacting of the various raised portions attained during production thereof, the magnitude and the position of the tangential tension and radial tension can be determined by the shape, size, and position of such raised portions. Therefore, in accordance with particular usages, the stability and the behavior during rotation of a circular saw blade can be improved; and simultaneously, a considerable amount of construction material can be saved. In comparison with carrying or support zones which are not deformed, the bending strength is increased and the friction between the zone 4 and the planes cut into the material is substantially reduced since the total contact area, i.e. the sum of the areas of the various raised portions which are in frictional contact with the material being cut is substantially less than that of a flat or less deformed carrying zone. The raised portions, furthermore, provide for cooling of the carrying zone 4 because during operation they provide for swirling of the surrounding air and, therefore, an increase in the rate of heat-removal from the carrying zone 4.

In order to reduce any arising friction to as great an extent as possible, the raised portions are outwardly rounded at the radially extending transition or edge 23, one of which is indicated in FIG. 1 with respect to portion 7. Due to this formation, the relatively low friction arising due to contact between the blade and the material to be worked on is further reduced, so that tumbling or wobbling movement and noise during idle running and operating are avoided.

The zone 4 according to FIG. 3 includes uniformly distributed portions 25, 26, and 27 on the zone large side and uniformly distributed portions 28, 29, and 30 on the other large side. As further indicated in FIG. 3, the portions are spaced at a distance as to one another on radii B and C, respectively. A nondeformed or flat radially extending, wedge-like portion or intermediate strip 31 is provided between a row of portions 25, 26, and 27 and a row of portions 28, 29, and 30. Small depressions 33 and 34 are arranged between portions 25 and 26 and 26 and 27, respectively. Similarly, depressions 33' and 34' are provided between portions 28 and 29 and 29 and 30, respectively. Further embodiments of the raised portions are shown in FIGS. 3 and 4, namely portions 25', 26', 27', and 28', 29', and 30'. The solid lines indicate raised portions on the forward large side of the carrying zone 4, while the portions 28', 29', and 30' on the rear large side of the carrying zone 4 are indicated in dot-dash outline. The portions 25' to 30', respectively, show one embodiment, so that on a carrying or support zone they are uniformly distributed thereon.

In the lower half of FIG. 3 to the right of the somewhat triangular portions 25' to 30' there is also indicated another embodiment of raised portions 25", 26" and 27". These portions are longitudinal in shape and extend in radial direction. They can be identical in length, or each can have a distinct length. Preferably, the outer raised portions 25" and 27" are of equal shape and extend, respectively, symmetrically to the central portion 26". Identically formed portions are arranged in uniform distribution on the forward and rearward large sides of the carrying zone 4.

FIG. 6 shows generally wave-like raised portions 36 to 40 which, in radial direction, alternatingly point or project to one and then to the other cutting side. Between three wave-like bent or shoulder portions 41 to 43, which are adjacent to flange zone 45, there is a non-deformed or flat intermediate annular zone 46. In contrast hereto, according to FIG. 7, between the flange zone 47 and the marginal zone 49, there are provided snake-like, undulating portions 48.

In the embodiment according to FIG. 8, the carrying zone 4 adjacent to its central flange zone 51, provides two wave-like portions 52 and 53, in radial direction, respectively. These wave-like portions 52 and 53 extend into a raised portion 54 which is radially wider. Subsequent to this are wave-like portions 55 and 56 which are continued in a raised portion (57) on the other side. Two wave-like raised portions 58 and 59 follow radially outwardly and merge in a ring-sector-like raised portion 60. The planar rim-zone 61 is next and follows this raised portion 60. Again, these raised portions are uniformly distributed on the carrying or support zone 4.

In accordance with the embodiment according to FIG. 9, next after a outer rim-zone 62 is a pair of wave-like raised portions 63 and 64, each having a large radius of curvature therewith. Radially further inwardly are sector-like raised portions 65, 66, 68, 69, alternatingly projecting from the alrge sides and flattened on the outer sides thereof. The radially inwardly raised portions are, respectively, wider than the outer ones.

FIG. 10 shows a wave-like raised portion 61 which follows the outer rim-zone 70. This raised portion 71 extends to the lateral limits of the cutting teeth 2 with a usual axial distance being provided. This raised portion 71 merges with a raised portion 74 which extends just about to the outer lateral limit or plane 73. In the direction of the lateral limit 72, the portion 74 is followed by a raised portion 75 and next to this are deformation-sections 76 and 77 which project beyond the lateral limits 72 and 73 and which moreover have greater width than the cutting width 6. Due to the deformation-sections 76 and 77, the rigidity of the carrying or support zone can be substantially increased.

Another way to describe the structure shown in FIGS. 1–10 and primarily shown in FIGS. 1–5 is to define the annular carrying zone 4 as being divided into alternating wedge-shaped segments of a first type E (see FIGS. 1 and 3) and a second type F (see FIGS. 1 and 3) by spaced radii (see FIG. 1). Referring specifically to FIGS. 3, 5 and 5a, the first type of segment E is defined by first embossments $e_1$, $e_2$, and $e_3$. The first embossments $e_1$, $e_2$, and $e_3$ are interrupted by, spaced by, and adjoined by second embossments $K_1$, $K_2$, $K_3$, and $K_4$ which have a width in the radial direction substantially less than the radial width of the first embossments. As is seen in FIG. 5, the first embossments $e_1$, $e_2$, and $e_3$ are raised with respect to the second embossments $K_1$, $K_2$, $K_3$, and $K_4$ when viewed from the first side and lowered with respect to the second embossments when viewed from the second side. The second type of segment F is illustrated by the dotted lines in FIG. 3 and is identical in configuration but organized in a pattern opposite to that of the first type of segment E in that the first embossments $f_1$, $f_2$, and $f_3$ are raised with respect to the second embossments $m_1$, $m_2$, $m_3$, and $m_4$ when viewed from the first side and lowered with respect to the second embossments when viewed from the second side. The second embossments $m_1$, $m_2$, $m_3$, and $m_4$ also have a radial width substantially less than the radial width of the first embossments $f_1$, $f_2$, and $f_3$. As seen in FIGS. 5 and 5a, the embossments abut one another along sloping sides P which sloping sides are oblique with respect to the first and second side of the carrying zone.

Figure 11:
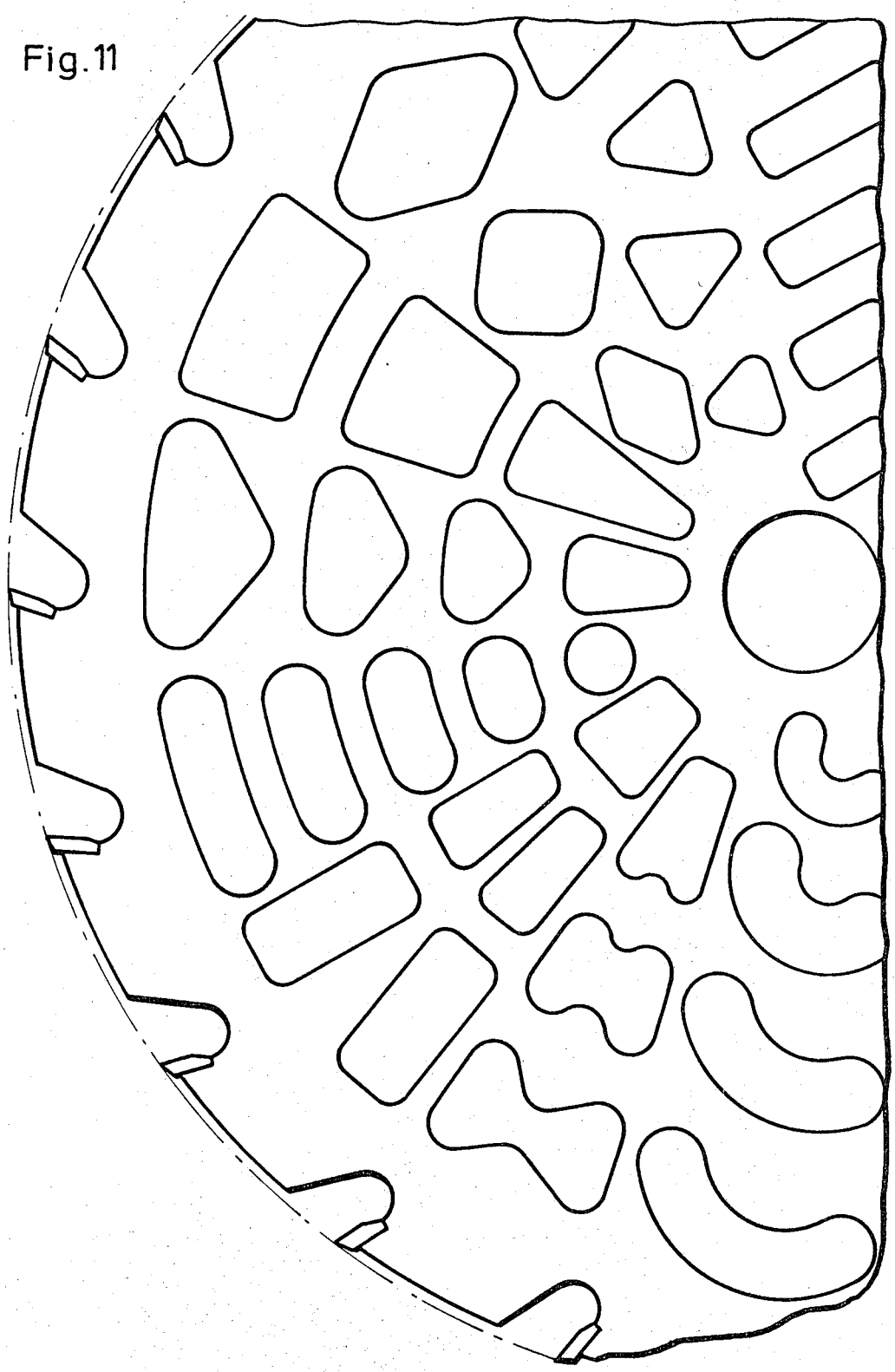
FIG. 11 is a plan view of part of a blade.

The embodiments according to FIG. 11 can be of any desired geometrical shape. Their greatest extent can be within the circumferential direction and in radial direction. The raised portions can be uniformly arranged and distributed, but also in a combination with identically the same zone or blade.

Further embodiments are shown in FIG. 12 wherein the forward extending raised portions 80 and 81 and the raised portions 82 and 83 extending on the rearward side in the upper part extend at an angle to the diameter of the saw blade belonging therewith. Consequently, in accordance with the invention, some raised portions, for example, raised portions 80, 81 are longer than the raised portions 82, 83 particularly in such a manner that these reach into the cutting zone 84. The right upper half shows a further approximately triangular raised portion 85 provided in the region of the cutting zone. With its surrounding tip, this portion 85 points radially inwardly.

The raised portions 86, 87, in the lower half of FIG. 12, also extend to the cutting zone 84 can be of any shape, and also can be arranged asymmetrically. The raised portions can also extend immediately up to receiving bore 5.

On the carrying zone 4 according to FIG. 13, the hard metal plates 3 are eccentrically arranged and, particularly, to the right of the central plane S—S. In the lower half of FIG. 13, the hard metal plates are secured to be symmetrical to the plane S—S. Also in the embodiment according to FIG. 14, the carrying zone 4 is eccentric to the hard metal plate 3. Such an asymmetrical embodiment is achieved particularly when the raised portions and carrying or support zone 4 are also asymmetrical to the central plane S—S. Hereby there is achieved that the cutting tooth (2) for example with its additional raised portion 85 (FIG. 12) is arranged to be on one side, namely, at one time to the right and at another time to the left of the central plane S—S (FIGS. 13 and 14).

When the raised portions 80 to 83 extend in the region of the receiving bore 5 of the blade, the ribbing (FIG. 13) covered by the clamping flange 88 is further reinforced by pretensioning of the clamping flange 88.

It is further contemplated that the rearward hollow areas of the raised portions and/or the sections between the raised portions of the carrying zone are provided with a dampening material 111 of construction, for example, with a plastic or synthetic material, which is applied by a coating method to at least partially fill the hollow areas. Consequently, a further dampening of the operational noises and a reduction of the inherent vibrations of the saw blade can be achieved with this dampening material 111.

Furthermore, FIG. 3 clearly indicates that the distances a and a' in the direction of the circumference of adjacent raised portions 25, 28; 26, 29; 27, 30; and 25', 28'; 26', 29'; 27', 30', are at least in part smaller than the circumferential widths b and b' measured at the same radial height or at a given circumference. In this manner, also in circumferential direction, a generally continuous, wavy pattern is provided so that only small frictional areas are presented during start-up of the circular saw blade and the highest possible profile is ensured.

The present invention is, of course, in no way restricted to the specific disclosure of the specification and drawings, but also encompasses any modifications within the scope of the appended claims.

I claim:

1. A metal circular saw blade that assures wobble-free, clean cuts for sawing wood and cutting grooves into wood and material similar to wood, said saw blade having a cutting zone and a central mounting bore, wherein the improvement in combination therewith comprises:
    an annular carrying zone extending substantially between said central mounting bore and said cutting zone, said carrying zone being comprised of a stiff annular disc of thin light metal of substantially uniform thickness defining first and second sides; the annular disc being divided into alternating wedge-shaped segments of a first and second type, each wedge-shaped segment being defined by an arc in the range of 15° to 30°;
    wherein: the first type of segment is defined by a first pattern comprising first and second embossments; the first and second embossments alternating with one another in the radial direction; the first embossments being raised with respect to the second embossments when viewed from the first side of the carrying zone and being lower with respect to the second embossments when viewed from the second side of the carrying zone; the first embossments being substantially wider in a radial direction than the second embossments; and the first and second embossments being joined to one another by surfaces which slope obliquely with respect to the sides of the annular carrying zone;
    wherein: the second type of segment is defined by a second pattern which is identical with, but reversed with respect to the first pattern, the second pattern comprising first and second embossments; the first and second embossments alternating with one another in the radial direction; the first embossments being raised with respect to the second embossments when viewed from the second side of the carrying zone and being lower with respect to the second embossments when viewed from the first side of the carrying zone; the first embossments being substantially wider in the radial direction than the second embossments, and the first and second embossments being joined to one another by surfaces which slope obliquely with respect to the sides of the annular carrying zone;
    and wherein: the cutting edge includes radial notches, each of which has a cutting tooth therein which tooth has a width which extends the tooth beyond the embossments in a direction perpendicular to the first and second sides;
    whereby, the resulting blade has an enhanced cutting capacity and enhanced cooling while being relatively stiff and stable when cutting due to the first and second embossments extending over the carrying zone.

* * * * *